US006845372B2

(12) United States Patent
Bates et al.

(10) Patent No.: US 6,845,372 B2
(45) Date of Patent: Jan. 18, 2005

(54) METHOD AND COMPUTER PROGRAM PRODUCT FOR IMPLEMENTING SEARCH ENGINE OPERATIONAL MODES

(75) Inventors: Cary Lee Bates, Rochester, MN (US); Paul Reuben Day, Rochester, MN (US); Mahdad Majd, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 09/891,980

(22) Filed: Jun. 26, 2001

(65) Prior Publication Data

US 2003/0009451 A1 Jan. 9, 2003

(51) Int. Cl.[7] .............................................. G06F 17/30
(52) U.S. Cl. ....................................................... 707/3
(58) Field of Search ........................ 707/3, 6, 1, 104.1, 707/103 R, 5, 102, 100, 4; 705/14; 345/781

(56) References Cited

U.S. PATENT DOCUMENTS

| 5,787,254 | A | | 7/1998 | Maddalozzo, Jr. et al. |
|---|---|---|---|---|
| 6,070,158 | A | * | 5/2000 | Kirsch et al. .................. 707/3 |
| 6,134,588 | A | | 10/2000 | Guenthner et al. |
| 6,401,118 | B1 | * | 6/2002 | Thomas ....................... 709/224 |
| 6,507,872 | B1 | * | 1/2003 | Geshwind ................... 709/236 |
| 6,538,673 | B1 | * | 3/2003 | Maslov ........................ 345/853 |

* cited by examiner

*Primary Examiner*—Safet Metjahic
*Assistant Examiner*—Sana Al-Hashemi (57) ABSTRACT

A method and computer program product are provided for implementing search engine operational modes. A search request is received from a user. Responsive to the search request, an impatient score for the user is determined. Responsive to the impatient score, a search engine operational mode is adjusted for implementing the search request. Multiple factors are evaluated to determine the impatient score for the user. These factors include selected ones of the following: the search words in the search request; presence of predefined control words in the search request; presence of predefined impatient words in the search request; a number of searches by the user during a search session; a time between searches; user connection speed; and user entry selections. Responsive to the impatient score, the search engine operational mode is adjusted by identifying the impatient score within a first define range and performing synonym augmentation of the search request; identifying the impatient score within a second define range and ordering search results by response time.

24 Claims, 10 Drawing Sheets

METHOD AND COMPUTER PROGRAM PRODUCT FOR IMPLEMENTING SEARCH ENGINE OPERATIONAL MODES

FIELD OF THE INVENTION

The present invention relates generally to the data processing field, and more particularly, relates to a method and computer program product for implementing search engine operational modes.

DESCRIPTION OF THE RELATED ART

Today the users of search engines have a wide range of personalities and desires. Some users are simply in a hurry and just want to find the one bit of information they need quickly. Other users are looking for either a more complete picture, or know the information they are looking for is going to be harder to find and methodically enter carefully crafted searches and read over each page.

It is easily understood why users often become frustrated with the search results that their search engine returns with such different user requirements and with users switching between these two modes from one searching session to another.

A need exists for a search engine that can detect whether the current user is in a methodical mode or in a hurried or impatient mode and adjusts a searching operational mode of the search engine to match the user's desires or requirements.

SUMMARY OF THE INVENTION

A principal object of the present invention is to provide a method and computer program product for implementing search engine operational modes. Other important objects of the present invention are to provide such method and computer program product for implementing search engine operational modes substantially without negative effect and that overcome many of the disadvantages of prior art arrangements.

In brief, a method and computer program product are provided for implementing search engine operational modes. A search request is received from a user. Responsive to the search request, an impatient score for the user is determined. Responsive to the impatient score, a search engine operational mode is adjusted for implementing the search request.

In accordance with features of the invention, multiple factors are evaluated to determine the impatient score for the user. These factors include selected ones of the following: the search words in the search request; presence of predefined control words in the search request; presence of predefined impatient words in the search request; a number of searches by the user during a search session; a time between searches; and user entry selections. Responsive to the impatient score, the search engine operational mode is adjusted by identifying the impatient score within a first define range and performing synonym augmentation of the search request; identifying the impatient score within a second define range and ordering search results by response time.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1A:
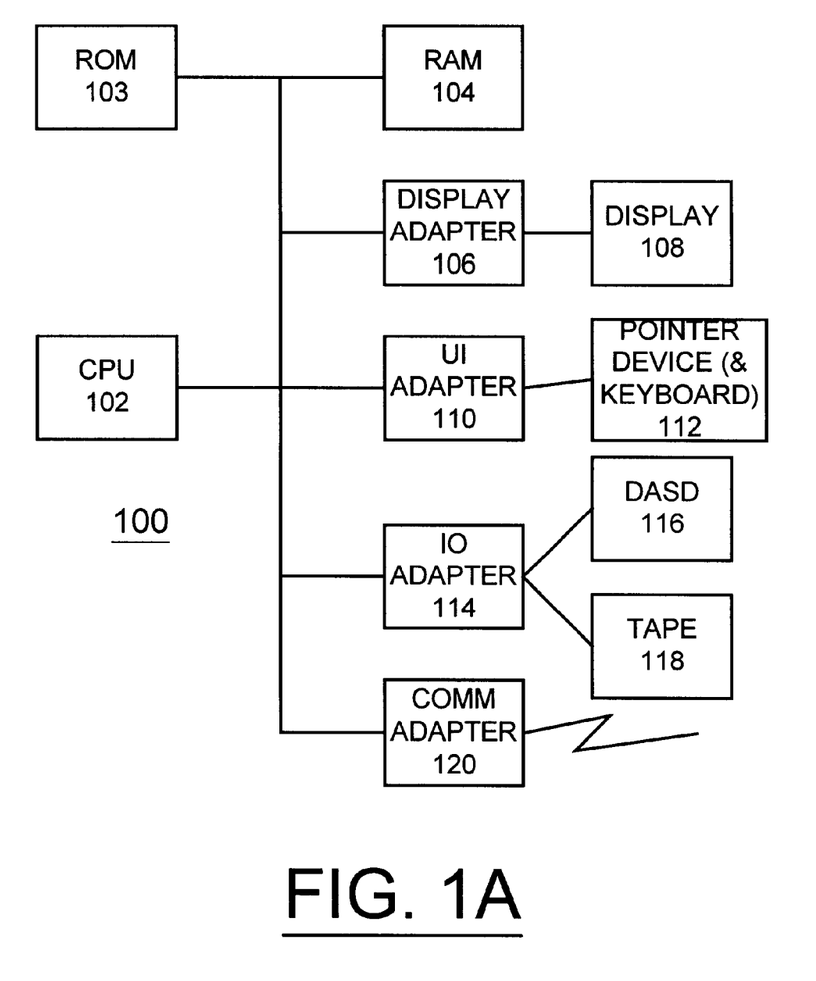
FIGS. 1A and 1B are block diagram representations illustrating a computer system and operating system for implementing search engine operational modes in accordance with the invention.
Figure 1B:
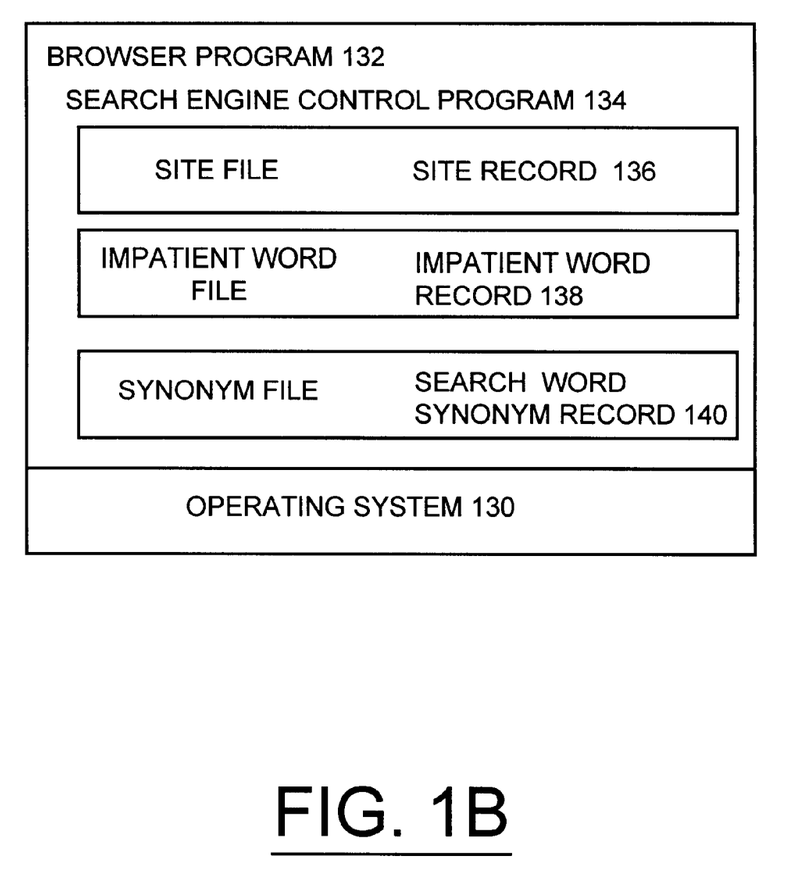

Having reference now to the drawings, in FIGS. 1A and 1B, there is shown a computer or data processing system generally designated by the reference character 100 for carrying out the search engine operational modes control methods of the preferred embodiment. As shown in FIG. 1A, computer system 100 includes a central processor unit (CPU) 102, a read only memory 103, a random access memory 104, a display adapter 106 coupled to a display 108. CPU 102 is connected to a user interface (UI) adapter 110 connected to a pointer device and keyboard 112. CPU 102 is connected to an input/output (IO) adapter 114 connected to a direct access storage device (DASD) 116 and a tape unit 118. CPU 102 is connected to a communications adapter 120 providing a communications function. It should be understood that the present invention is not limited to a computer model with a single CPU, or other single component architectures as shown in FIG. 1A.

As shown in FIG. 1B, computer system 100 includes an operating system 130, a browser program 132 and a search engine control program 134 of the preferred embodiment. A site record 136, an impatient word record 138 and a search word synonym record 140 are stored in accordance with the search engine operational modes control methods of the preferred embodiment. It should be understood that various components could be stored on a server computer (not shown) or the client computer system 100. For example, the site record 136 could be stored on a server computer.

Various commercially available computers can be used for computer system 100, for example, an IBM personal computer. CPU 102 is suitably programmed by the search engine control program 134 to execute the flowcharts of FIGS. 3, 4A, 4B, 5, 6 and 7.

Figure 2A:
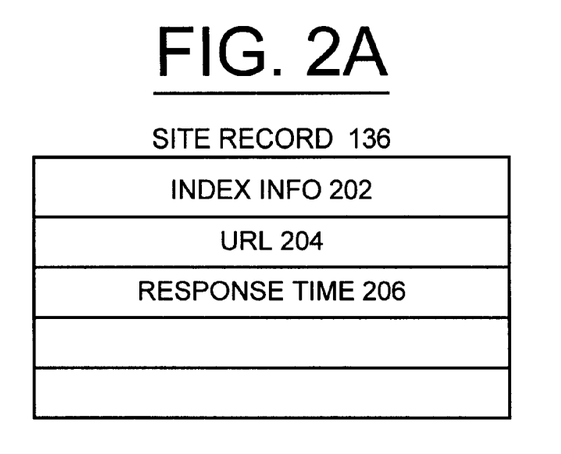
FIGS. 2A, 2B and 2C are diagrams respectively illustrating a site record, an impatient word record and a search word synonym record in accordance with the preferred embodiment.
Figure 2B:
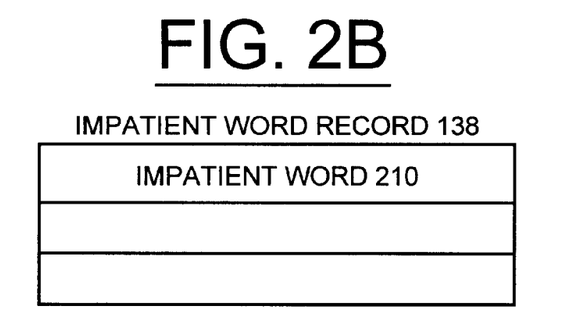
Figure 2C:
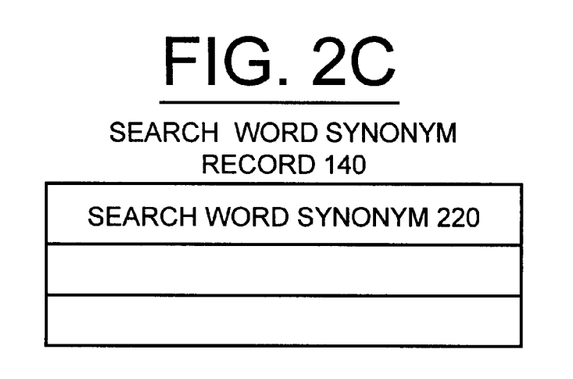

Referring also to FIGS. 2A, 2B and 2C, there are diagrams respectively illustrating the site record 136, impatient word record 138 and search word synonym record 140 in accordance with the preferred embodiment. Site record 136 includes multiple fields comprising index information 202, a Universal Resource Locator (URL) 204, and a response time 206. Site records 136 used by the search engine control program 134 of the preferred embodiment for ordering search results are generated separately from user searches as illustrated and described with respect to FIG. 7.

In accordance with features of the preferred embodiment, the search engine control program 134 determines if the user is currently impatient, then modifies the search or search engine operational mode in several ways to better serve the hurried user. The search engine control program 134 conditionally orders sites earlier in the search results if they respond or load faster, so that the user will be presented with the information sooner. Initially, sites are ordered by criteria of search results. When the search results are otherwise equal, sites within this otherwise equal set are ordered based upon which are found to load faster than others. Also the more impatient the user is determined to be, more weight is given to response time. The reasoning is that not only does the hurried person want the sites to respond more quickly, but because the hurried person spends less time formulating the search, it is likely that after looking at a few sites that the hurried person will quickly reformulate the search criteria and resubmit the search again and again, so that ordering the quickest responding sites first helps the hurried person through this process faster.

Figure 3:
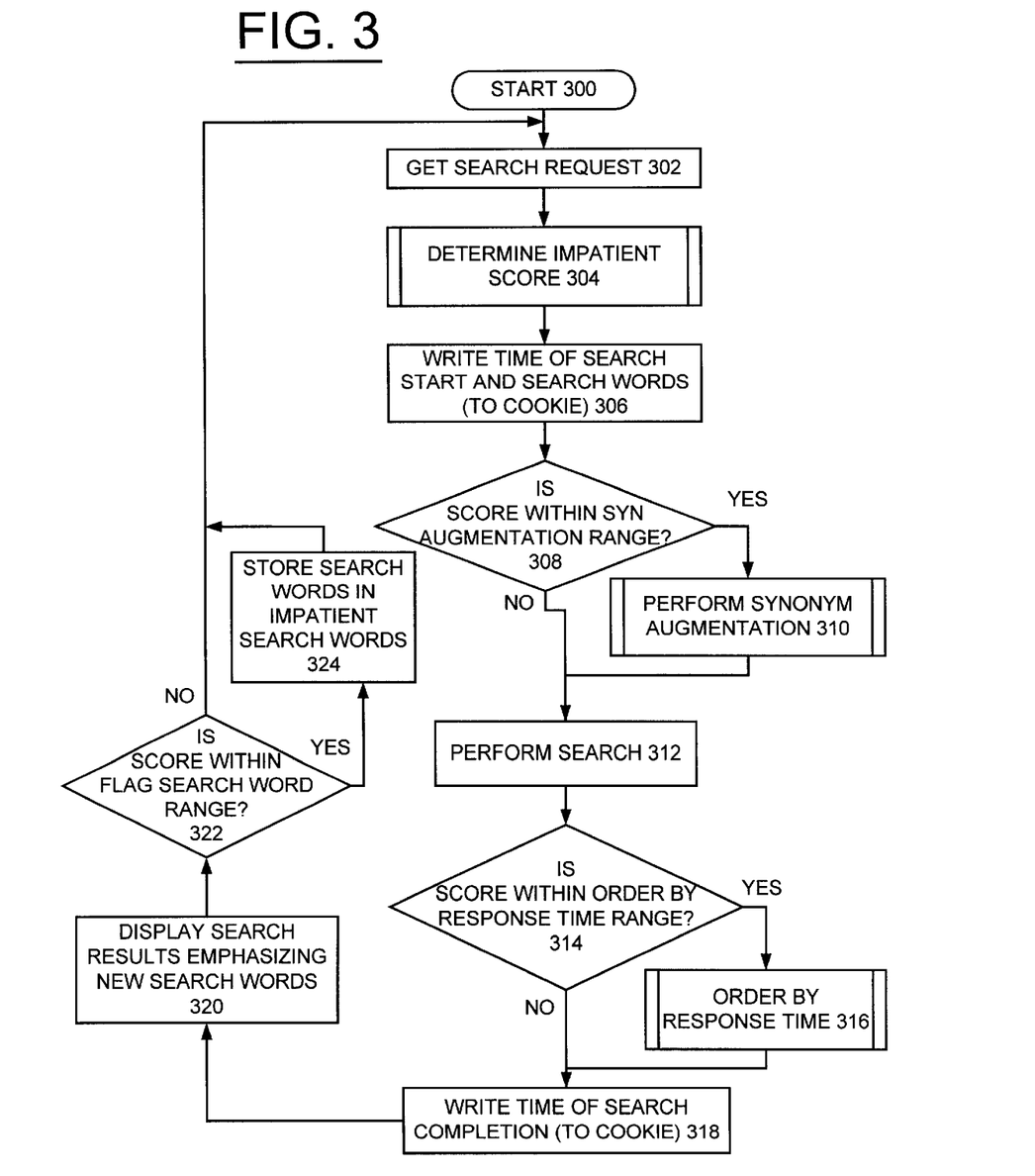
FIGS. 3, 4A, 4B, 5, 6 and 7 are flow charts illustrating exemplary steps for implementing search engine operational modes in accordance with the preferred embodiment.
Figure 4A:
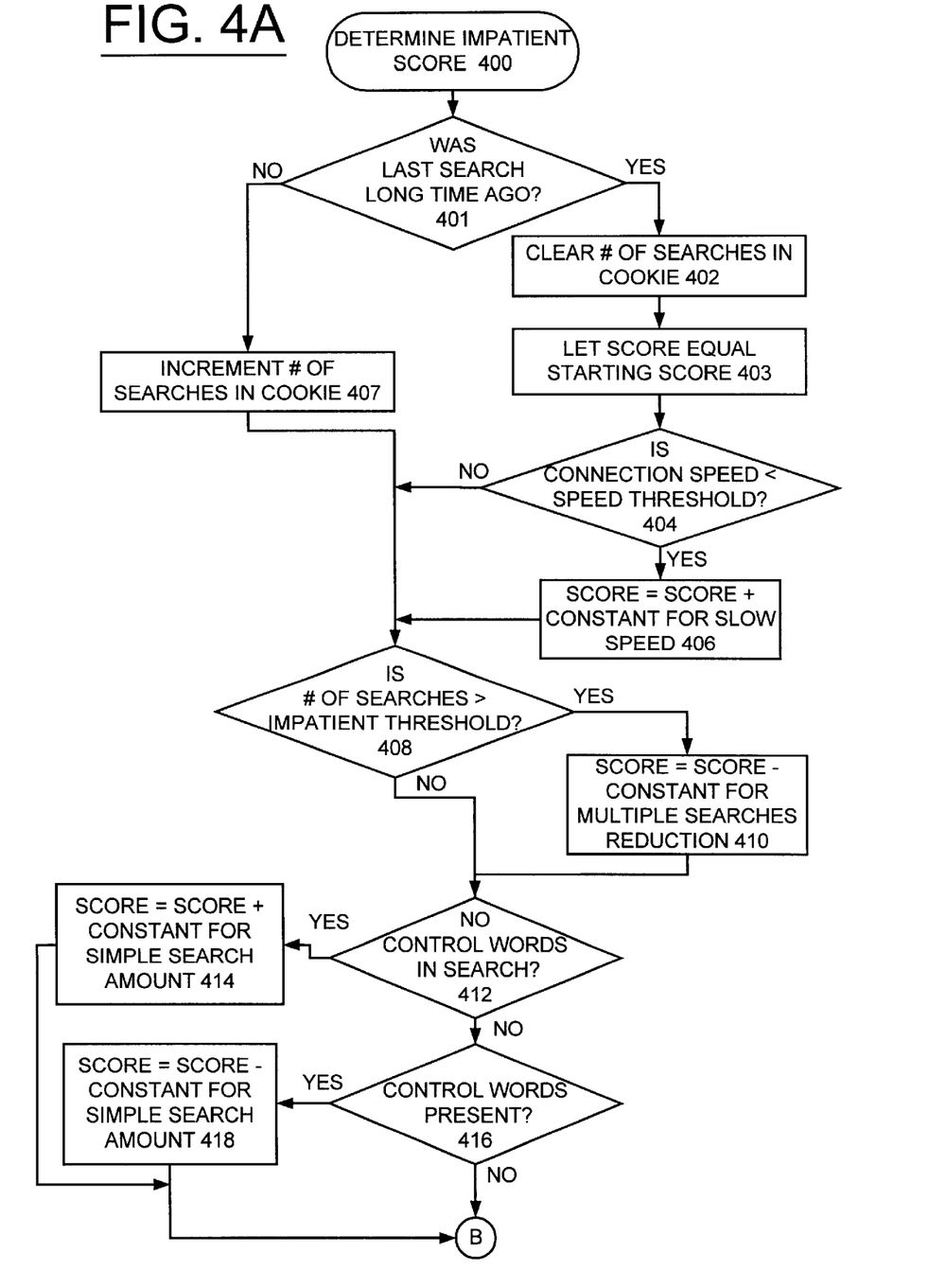
Figure 4B:
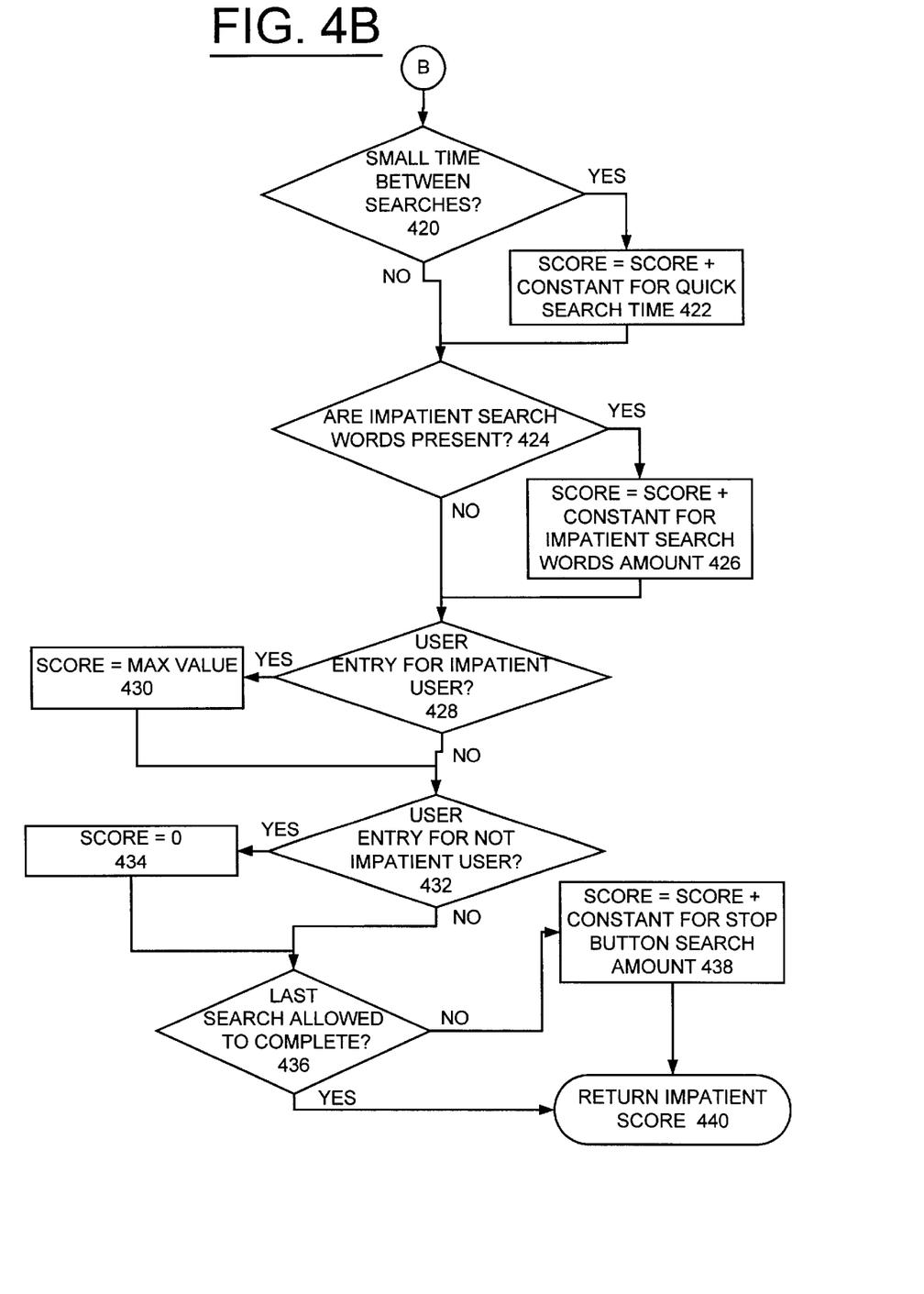

Referring now to FIG. 3, there are shown exemplary steps for implementing search engine operational modes in accordance with the preferred embodiment starting at a block 300. A search request is received as indicated in a block 302. A routine, illustrated and described with respect to FIGS. 4A and 4B, is performed to determine an impatient score as indicated in a block 304. A time of search start and search words are stored; for example, the time of search start and search words are written to a cookie or other local storage as indicated in a block 306.

Figure 5:
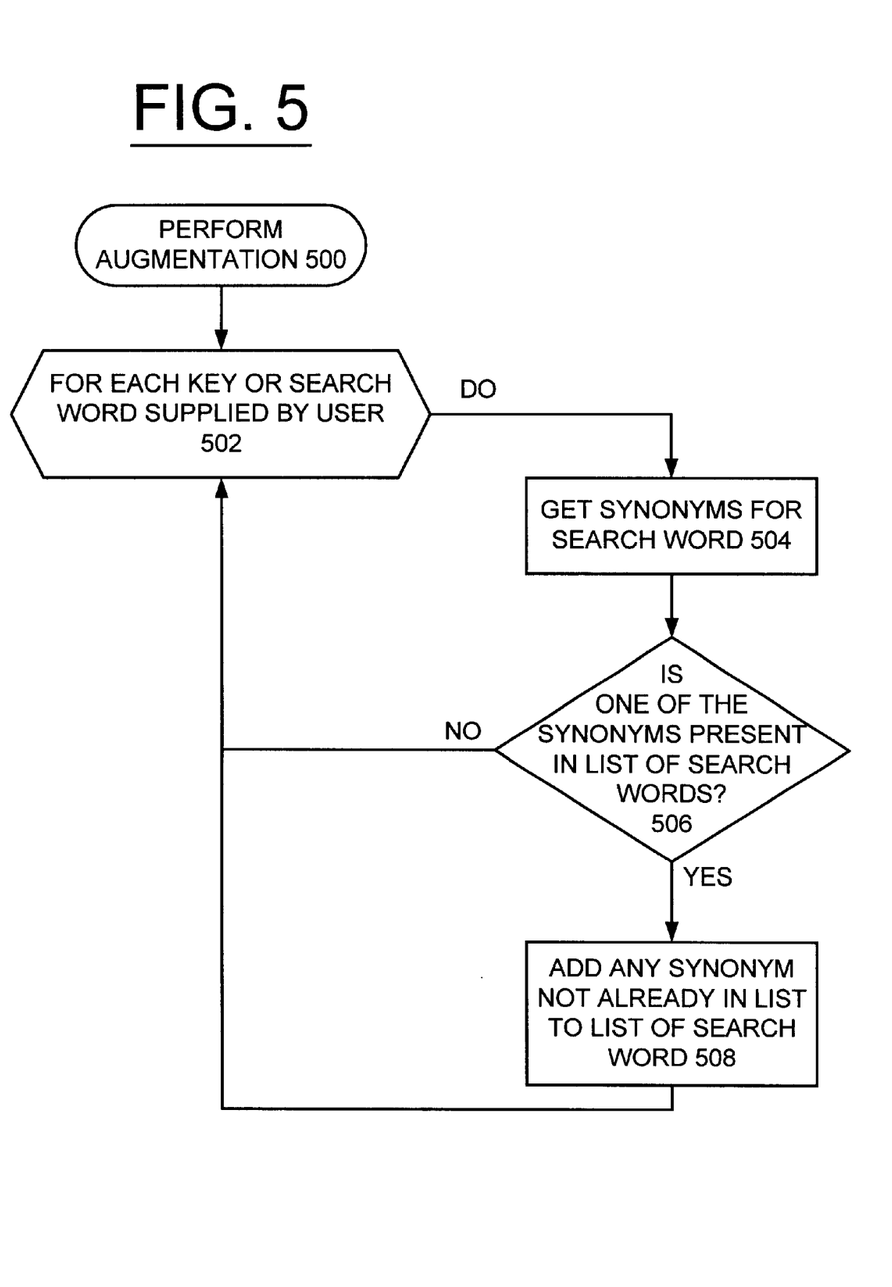

Checking whether the impatient score is within a synonym augmentation range is performed as indicated in a decision block 308. If so, then a synonym augmentation routine, illustrated and described with respect to FIG. 5, is performed as indicated in a block 310. If the user is determined to definitely be in a hurry and the search includes a search or key word that is a synonym of another search word, then the search engine control program 134 of the preferred embodiment determines if there are more synonyms of both words and if so uses these synonyms in the search as well as the other search words. That the words used to enhance the search must be synonyms of search words already determined to be synonyms in the search criteria reduces the chances that wrong meanings of words will be used, and at the same time improves the search for the hurried user who in all likelihood is not taking the time to be more savvy about the search criteria.

Then the search is performed as indicated in a block 312. Checking whether the impatient score is within an order by response time range is performed as indicated in a decision block 314. When the impatient score is within an order by response time range, then an order by response time routine is performed as indicated in a block 316. A time of search completion is stored; for example, the time of search completion is written to a cookie or other local storage as indicated in a block 318.

Then the search results are displayed emphasizing new search words as indicated in a block 320. On subsequent searches where the search words are mostly the same, the search engine of the preferred embodiment emphasizes the newer search words when displaying the results. Today search engines will often pull out a section of text from the page that contains some of the search words, in this case the search engine would make sure the text includes the newer search word entered, regardless of its position in the search criteria.

Checking whether the impatient score is within a flag search word range is performed as indicated in a decision block 322. When the impatient score is within the flag search word range, then the search words are stored as impatient search word 210 in impatient word records 138. Then the sequential operations return to block 302 to get a next search request.

Keyword tracking is implemented with the impatient word record 138. Once the impatience score reaches a relatively high level where it is known the user is truly in a hurry, the key words that the user enters have an associated field to incriminate and show that search words were entered by an impatient user. For example, if these words get their scores increased enough so that their scores are in the top percentage, such as 5% of all scores of all keywords, then if a user enters one of these words their impatient score is increased slightly as illustrated in FIG. 4B. To allow these words to change over time and be current, the search engine control program 134 could slightly reduce the score associated with each keyword every night, so that unless a keyword is still frequently being entered by impatient users, its score would eventually drop below the point to influence a user's impatience score.

The search engine control program 134 of the preferred embodiment is activated in the context of a search session with a search request received at block 302. A searching session includes a set of searches done within some defined time period. If enough time elapses between searches, such as 45 minutes, then it is assumed that a new session has been initiated and the search engine control program 134 of the preferred embodiment resets itself and determines if the user is hurried by performing the determine impatient score routine at block 304.

Referring now to FIGS. 4A and 4B, exemplary steps of the routine, performed to determine an impatient score of the preferred embodiment are shown starting at a block 400. Multiple factors are used to determine impatience and several methods are employed to determine whether the user is currently impatient or slow and methodical.

In accordance with features of the preferred embodiment, one or more factors are used in combination to make a determination about the user's current operating mode. For example, when the user first enters the search the factors would be primary in determining the likelihood that the person is currently impatient. Accumulating impatient points enables a determination of whether a person is impatient. For example, formulating a simple search adds a small amount of points to the total of the impatient points. Using words that are in the top percentage of words frequently entered by impatient users also contributes slightly to the impatience score. By the second search the user, if truly in a hurry, has had enough chances to build an impatient score that shows that the user is currently impatient. If the user continues to exhibit impatient behavior, by the third search the impatient score of the user could be high enough that it would be clear the user is impatient, and the search engine will operate with all impatience features fully active.

Checking if the last search was a long time ago is performed as indicated in a decision block 401. For example, when the cookie storing the last start of search time indicates a time above a set threshold time, such as one hour, a new search session is indicated, a cookie storing a number of searches is cleared or set to zero as indicated in a block 402. Then an impatient score is set to a starting score as indicated in a block 403. Checking if the user's connection speed is less than a predefined connection speed threshold is performed as indicated in a decision block 404. The slower the connection speed, for example for a user having a slow modem, the more the user will be more inclined to see the faster sites first, all else being equal. When the user's connection speed is less than a predefined connection speed threshold, the impatient score is increased by a defined constant for slow speed connection as indicated in a block 406. Otherwise when the last start of search time indicates a time less than or equal to the set threshold time, then the same search session is indicated, the current impatient score are not changed and the number of searches is incremented by one in the cookie as indicated in a block 407.

Next, checking whether the number of searches is greater than an impatient threshold is performed as indicated in a decision block 408. The number of searches that the user has indicates that the user has likely become less impatient over time. When the number of searches is greater than the impatient threshold, then a constant for multiple searches reduction is subtracted from the impatient score as indicated in a block 410. Otherwise when the number of searches is less than or equal to the impatient threshold, the impatient score is not changed.

Checking if no control words are in the search is performed as indicated in a decision block 412. Control words include, for example, and, or, parenthesis ( ) and the like. The complexity of the search criteria indicates the time spend by the user. By using control words or other such operators, rather than including only search words before pressing the submit button, it is assumed that the user is not impatient or in a hurry. When no control words are in the search, then a constant for a simple search amount is added to the impatient score as indicated in a block 414. Otherwise when control words are identified in the search as indicated in a decision block 416, the constant for the simple search amount is subtracted from the impatient score as indicated in a block 418. It should be understood that different constants could be used at blocks 414 and 418. The sequential steps continue following entry point B in FIG. 4B.

Referring to FIG. 4B, checking the time between searches is performed as indicated in a decision block 420. If the time between searches is really short, the user is probably impatient. When a small time between searches is found, a constant for quick search time is added to the impatient score as indicated in a block 422. Checking for impatient search words 210 in the search is performed as indicated in a decision block 424. Some search words are determined to be indicative of people in a hurry. Once the search engine control program 134 of the preferred embodiment determines that a person is impatient through whatever factors, an impatience score is associated with search words. Over time if a keyword is often used by impatient users, the keyword or impatient search words 210 is used to help predict that a user is impatient. When one or more impatient search words 210 are found in the search, a constant for impatient search words is added to the impatient score as indicated in a block 426.

Checking for a user entry for impatient user is performed as indicated in a decision block 428. The search engine control program 134 of the preferred embodiment provides a user operated button for the user to select a current search mode. A truly impatient user may not bother to answer, but the buttons can be used to indicate to the user the current search engine operational mode. When a user entry for impatient user is identified at decision block 428, the impatient score is set to a maximum value as indicated in a block 430. Checking for a user entry for not impatient user is performed as indicated in a decision block 432. When a user entry for not impatient user is identified at decision block 432, the impatient score is set to zero as indicated in a block 434.

Checking recent search results to determine if the last search was allowed to complete is performed as indicated in a decision block 436. If the user presses the stop button before sites of the current search are down loaded, this indicates being hurried or impatient. Or if a link does not result in the screen being cleared right away, and the user presses another link in the search results, thus canceling their request for the first URL, this is a sign of being in a hurry. If determined that the last search was not allowed to complete, then a constant for stop button search amount is added to the impatient score as indicated in a block 438. If the last search was allowed to complete or after the constant for stop button search amount is added to the impatient score at block 438, then the impatient score is returned as indicated in a block 440.

It should be understood that triggering one of the factors above is normally not enough to have the search engine control program 134 of the preferred embodiment determine that the user is impatient. Other activities, such as entering a well formulated search, or if a greater than average amount of time transpires between searches, or if the user has tried more than some number of searches during the current session, results in points being subtracted from the impatient score total. Over time the impatient score for a truly impatient user would likely erode or the impatient score is decreased, for example, at blocks 403, 410 and 418 of FIG. 4A.

It should be understood that the search engine control program 134 of the preferred embodiment could include other factors than shown in FIGS. 4A and 4B. For example, mouse movements by the user could be monitored or evaluated with a plug-in program. If the user's mouse movements are quick and jerky, as if the user is beating up the mouse, then he is likely more hurried than if the mouse movements are slow, smooth and deliberate. The impatient score could include a factor based upon the user's mouse movements.

Referring now to FIG. 5, actions based upon the returned impatient score at block 440 of FIG. 4B include synonym augmentation. FIG. 5 illustrates exemplary steps for synonym augmentation. Synonym augmentation is performed at block 310 of FIG. 3 when the returned impatient score at block 440 falls within the defined synonym augmentation range. Once the impatient score reaches a relatively high level, then the search engine control program 134 looks for the user to add synonyms to the search request of words that are in the search request. The search engine control program 134 looks for words that are synonyms of two or more words for use in the search as well. Synonym augmentation starts at a block 500. For each key or search word supplied by the user as indicated in a block 502, synonyms for the search word is obtained as indicated in a block 504. Checking if one of the synonyms is present in the list of search words of the current search is performed as indicated in a decision block 506. If not, a next each key or search word supplied by the user is obtained at block 502. When one of the synonyms is present in the list of search words of the current search, any synonym not already in the list is added to the list of search words as indicated in a block 508. Then a next each key or search word supplied by the user is obtained at block 502 until all keys or search words are processed.

Figure 6:
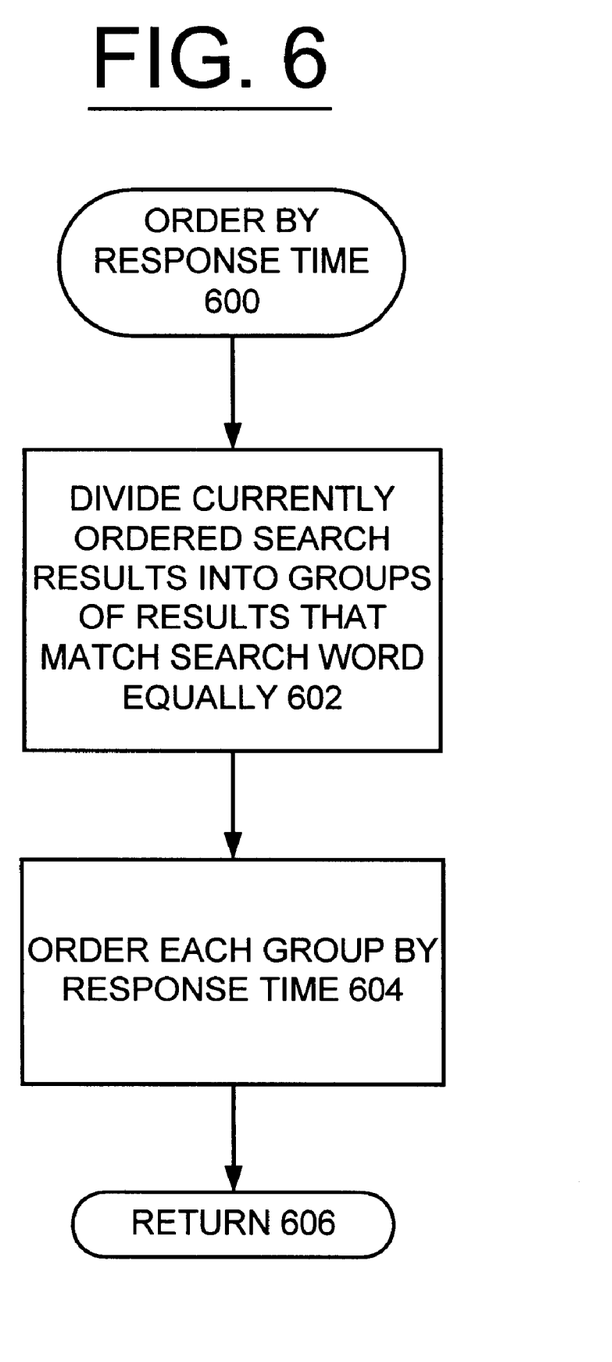

Referring now to FIG. 6, actions based upon the returned impatient score at block 440 of FIG. 4B include response time ordering. Before the search engine control program 134 determines that a user is impatient, results are ordered in the normal way, and if there is a tie the site with the better response or load time is ordered first.

In accordance with features of the preferred embodiment, once the search engine control program 134 determines that the user is impatient, the search engine control program 134 gives more weight to the response time so that if a first site or URL is a just slightly better match than another second URL, but the first site has a slow response time, and the second site is quick, the search engine control program 134 orders the second site before the first site. The more impatient the user is determined to be, the greater this effect. Alternately, if the user has a slower modem, the user may want to tell this to the search engine and so that search engine control program 134 gives faster loading sites slightly higher priority from the start.

In FIG. 6, as indicated in a block 600, ordering by response time starts. Currently ordered search results are divided by degree of match or into groups of results that match search words equally as indicated in a block 602. Next each group is ordered by response time as indicated in a block 604. Then the sequential operations return as indicated in a block 606.

Figure 7:
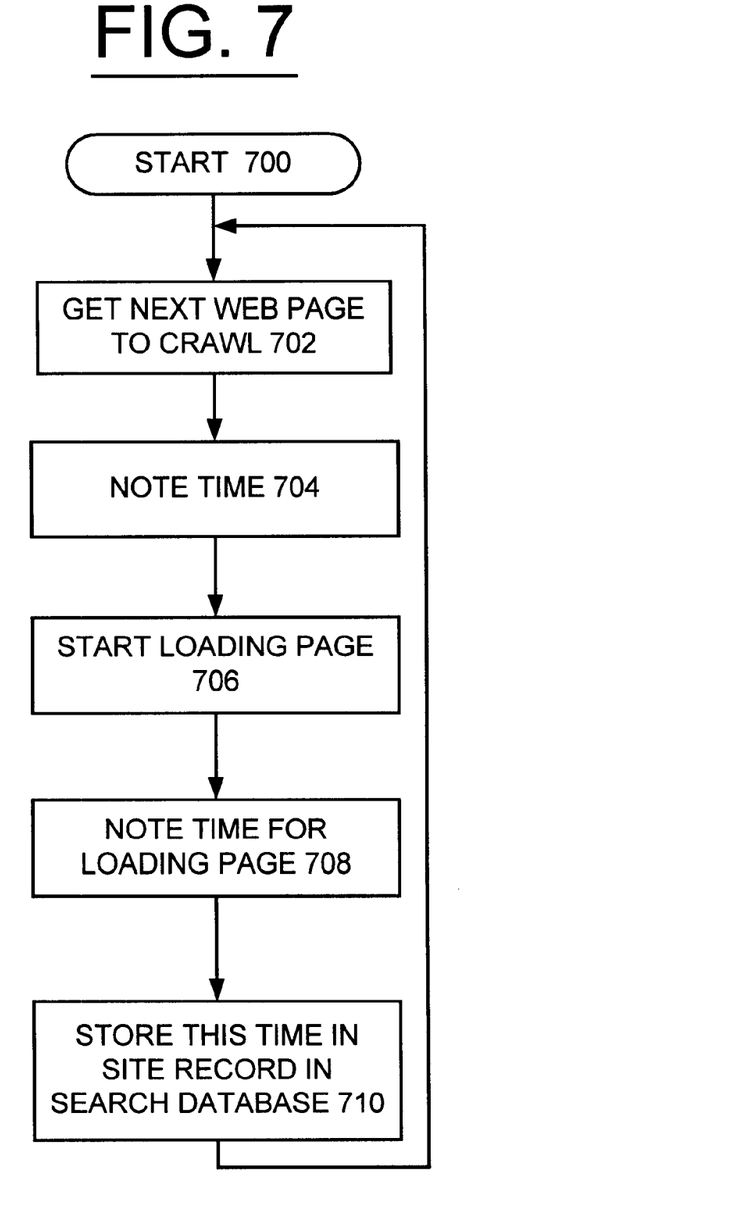

Referring now to FIG. 7, exemplary sequential steps for determining site response time of the preferred embodiment are shown starting at block 700. The primary way to determine site response time is to save the time it takes to load each site when a web crawler background code is crawling through the URLs on the web. A next web page to crawl is obtained as indicated in a block 702. Time is noted as indicated in a block 704. Loading of the page is started as indicated in a block 706. The time it took to load the page is noted as indicated in a block 708. Then this time is stored in the site record 136 in a search database used by the search engine control program 134 as indicated in a block 710.

Alternatively and in addition to the exemplary steps of FIG. 7, the search engine control program 134 can further refine this data and tune it for various domains and locations by allowing users to install a plug-in that tracks the load time of a particular URL. To do this the search results page would tell the plug-in which URLs are of interest, probably by using cookies, though parameters on the URL, would work as well. When loading a URL the plug-in tracks the time it takes to load the URL page, and if the URL is one that the search engine is interested in, the plug-in sends this information to the search engine control program 134, for example, by writing the information to a cookie. If cookies are used, when the search engine results page unloads, the plug-in looks for all the cookies then sends the information back to the search engine control program 134 and removes the cookies. This way the search engine control program 134 knows how quickly each of the URLs visited from one of their search results pages is loaded for a particular domain.

Note that the plug-in could simply track the response time for all URLs that the user visits, but in the preferred embodiment, the plug-in tracks only the URLs returned to the user in search results. Because geographic location can also play a small role in performance, the search engine control program 134 can track this as well, so that if the user is willing to tell the search engine their approximate location their results can be further refined. Alternately the search engine control program 134 may employ other methods to determine the degree to which the response time is significant, including the speed of the user's connection at blocks 404 in FIG. 4A. If the user has a plug-in that tracks the load time of a particular URL, his speed can be compared to the average speed of other users, and if his speed is significantly below average, the user will be more inclined to see the faster sites first. For example, a site with many images that take a long time to bring in should best be put lower in the search results for this user, all else being equal.

In addition these factors can be used to determine the granularity of relevance of performance. If the user has a fast modem, two large but not quite equal sites may be treated as equal in response time, but if the user is using a slow modem, the slight difference in size may be significant enough in terms of load time that the sites would not be treated equally with respect to download times. In this way, even if the user is not determined to be impatient, the degree of ordering based on response time may be enhanced, as provided at block 406 in FIG. 4A.

Figure 8:
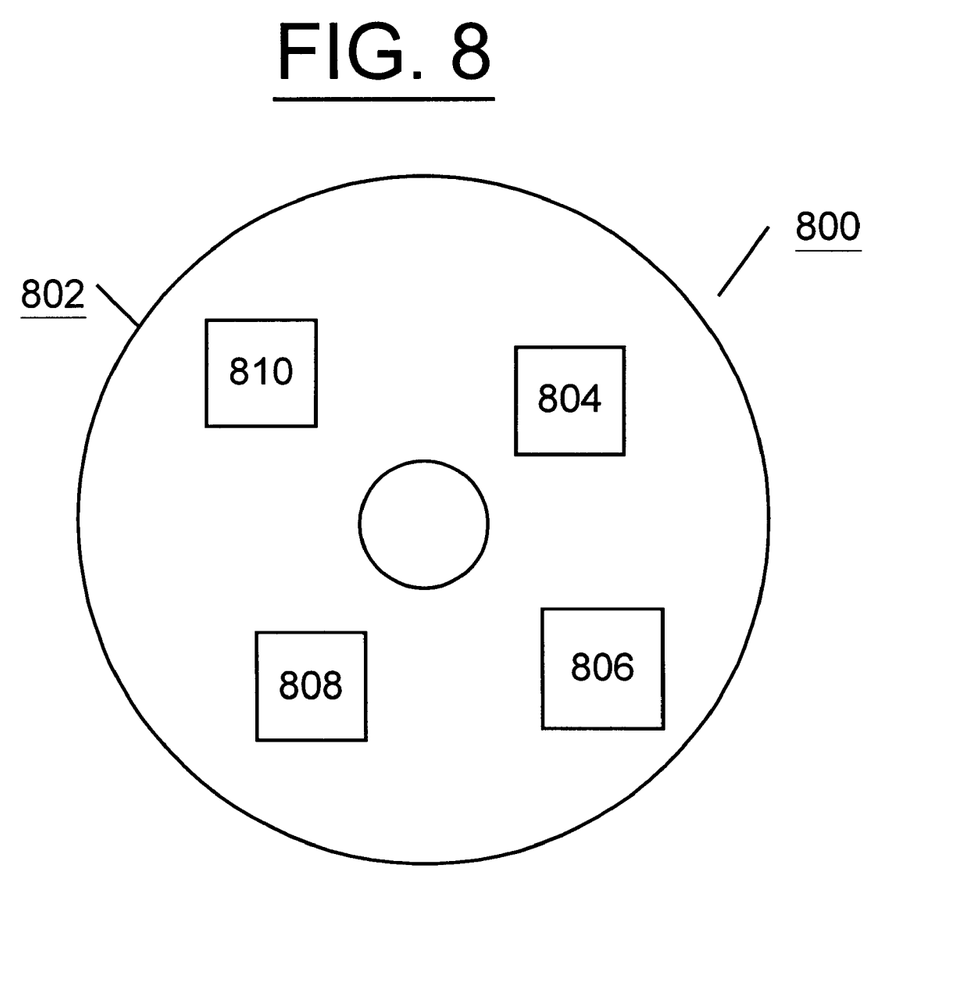
FIG. 8 is a block diagram illustrating a computer program product in accordance with the preferred embodiment.

Referring now to FIG. 8, an article of manufacture or a computer program product 800 of the invention is illustrated. The computer program product 800 includes a recording medium 802, such as, a floppy disk, a high capacity read only memory in the form of an optically read compact disk or CD-ROM, a tape, a transmission type media such as a digital or analog communications link, or a similar computer program product. Recording medium 802 stores program means 804, 806, 808, 810 on the medium 802 for carrying out the methods for implementing search engine operational modes of the preferred embodiment in the system 100 of FIG. 1.

A sequence of program instructions or a logical assembly of one or more interrelated modules defined by the recorded program means 804, 806, 808, 810, direct the computer system 100 for implementing search engine operational modes of the preferred embodiment.

While the present invention has been described with reference to the details of the embodiments of the invention shown in the drawing, these details are not intended to limit the scope of the invention as claimed in the appended claims.

What is claimed is:

1. A method for implementing search engine operational modes comprising the steps of:

receiving a search request from a user;

responsive to said search request, determining a search mode score for the user;

responsive to said search mode score, adjusting a search engine operational mode for implementing said search request.

2. A method for implementing search engine operational modes as recited in claim 1 wherein the step responsive to said search request, of determining said search mode score for the user includes the steps of identifying a number of searches and comparing said identified number of searches with a threshold value.

3. A method for implementing search engine operational modes as recited in claim 2 further includes the step of adjusting said search mode score responsive to said identified number of searches being greater than said threshold value.

4. A method for implementing search engine operational modes as recited in claim 3 wherein the step of adjusting said search mode score responsive to said identified number of searches being greater than said threshold value includes the step of subtracting a constant amount for said identified number of searches being greater than said threshold value from said search mode score.

5. A method for implementing search engine operational modes as recited in claim 1 wherein the step responsive to said search request, of determining said search mode score for the user includes the steps of checking for predefined control words in said search request.

6. A method for implementing search engine operational modes as recited in claim 5 further includes the step of adjusting said search mode score responsive to no predefined control words in said search request.

7. A method for implementing search engine operational modes as recited in claim 6 wherein the step of adjusting said search mode score responsive to no predefined control words in said search request includes the step of adding a constant amount for a simple search to said search mode score.

8. A method for implementing search engine operational modes as recited in claim 5 further includes the step of adjusting said search mode score responsive to identifying at least one predefined control words in said search request.

9. A method for implementing search engine operational modes as recited in claim 8 wherein the step of adjusting said search mode score responsive to identifying at least one predefined control words in said search request includes the step of subtracting a predefined constant value from said search mode score.

10. A method for implementing search engine operational modes as recited in claim 1 wherein the step responsive to said search request, of determining said impatient score for the user includes the steps of adjusting said search mode score responsive to identifying a connection speed less than a predefined connection speed threshold.

11. A method for implementing search engine operational modes as recited in claim 10 wherein the step of adjusting said search mode score responsive to identifying said connection speed less than a predefined connection speed threshold includes the step of subtracting a predefined constant value from said search mode score.

12. A method for implementing search engine operational modes as recited in claim 1 wherein the step responsive to said search request, of determining said search mode score for the user includes the steps of checking a time value between received search requests.

13. A method for implementing search engine operational modes as recited in claim 12 further includes the step of adjusting said search mode score responsive to identifying a predefined time period indicative of an impatient user.

14. A method for implementing search engine operational modes as recited in claim 13 wherein the step of adjusting said search mode score responsive to identifying a predefined time period indicative of an user includes the step of adding a predefined constant value to said impatient search mode score.

15. A method for implementing search engine operational modes as recited in claim 1 wherein the step responsive to said search request, of determining said search mode score for the user includes the steps of checking a number of search requests by the user; and adjusting said search mode score responsive to identifying said number of search requests by the user being greater than a defined threshold value.

16. A method for implementing search engine operational modes as recited in claim 1 wherein the step responsive to said search request, of determining said search mode score for the user includes the steps of checking for a user entry indicative of the user's operational mode selection; and adjusting said search mode score responsive to said user entry.

17. A method for implementing search engine operational modes as recited in claim 1 wherein the step responsive to said search request, of determining said search mode score for the user includes the steps of checking for a user stop entry during a recent search; and adjusting said search mode score responsive to said user entry.

18. A method for implementing search engine operational modes as recited in claim 1 wherein the step responsive to said search mode score, adjusting a search engine operational mode for implementing said search request includes the steps responsive to said search mode score being within a predefined range, of performing synonym augmentation of said search request.

19. A method for implementing search engine operational modes as recited in claim 1 wherein the step responsive to said search mode score, adjusting a search engine operational mode for implementing said search request includes the steps responsive to said search mode score being within a predefined range, of ordering search results by response time.

20. A method for implementing search engine operational modes as recited in claim 1 wherein the step responsive to said search mode score, adjusting a search engine operational mode for implementing said search request includes the steps responsive to said search mode score being within a predefined range, of storing words from said search request in an impatient search word file.

21. A method for implementing search engine operational modes as recited in claim 1 includes the steps of displaying search results and emphasizing new search words in said search results.

22. A computer program product for implementing search engine operational modes, said computer program product including a plurality of computer executable instructions stored on a computer readable medium, wherein said instructions, when executed by said computer, cause the computer to perform the steps of:

receiving a search request from a user;

responsive to said search request, determining a search mode score for the user;

responsive to said search mode score, adjusting a search engine operational mode for implementing said search request.

23. A computer program product for implementing search engine operational modes as recited in claim 22 wherein said step responsive to said search request, determining said search mode score for the user includes the steps of: evaluating a plurality of factors and adjusting said search mode score responsive to said evaluations; said factors including at least one of the user entered search words in said search request; presence of predefined control words in said search request; presence of predefined impatient words in said search request; a number of searches by the user during a search session; a time between searches; a connection speed; and user entry selections.

24. A computer program product for implementing search engine operational modes as recited in claim 22 wherein said step responsive to said search mode score, of adjusting a search engine operational mode for implementing said search request includes the steps of identifying said search mode score within a first define range and performing synonym augmentation of said search request; identifying said search mode score within a second define range and ordering search results by response time.

* * * * *

UNITED STATES PATENT AND TRADEMARK OFFICE
CERTIFICATE OF CORRECTION

PATENT NO. : 6,845,372 B2
DATED : January 18, 2005
INVENTOR(S) : Cary Lee Bates et al.

It is certified that error appears in the above-identified patent and that said Letters Patent is hereby corrected as shown below:

Title page,
Item [74], *Attorney, Agent, or Firm*, insert -- Joan Pennington --

Column 9,
Line 39, after "an" insert -- impatient --.
Line 40, delete "impatient".

Signed and Sealed this

Third Day of May, 2005

JON W. DUDAS
*Director of the United States Patent and Trademark Office*